United States Patent

Dieck et al.

[11] 4,053,456
[45] Oct. 11, 1977

[54] POLY(ARYLOXYPHOSPHAZENE) COPOLYMERS

[75] Inventors: Ronald L. Dieck; Edwin J. Quinn, both of Lancaster, Pa.

[73] Assignee: Armstrong Cork Company, Lancaster, Pa.

[21] Appl. No.: 661,862

[22] Filed: Feb. 27, 1976

[51] Int. Cl.$^2$ .............................................. C08J 9/06
[52] U.S. Cl. .................. 260/47 P; 260/2 P; 260/2.5 FP; 260/2.5 R; 260/18 R; 260/23 R; 260/30.4 N; 260/32.6 N; 260/33.6 R; 260/37 N
[58] Field of Search .................. 260/2 P, 47 P, 2.5 R

[56] References Cited

U.S. PATENT DOCUMENTS

| | | | |
|---|---|---|---|
| 3,370,020 | 2/1968 | Allcock et al. | 260/2 P |
| 3,515,688 | 6/1970 | Rose | 260/2 P |
| 3,700,629 | 10/1972 | Reynard et al. | 260/2 P |
| 3,702,833 | 11/1972 | Rose et al. | 260/2 P |
| 3,844,983 | 10/1974 | Reynard et al. | 260/2 P |
| 3,856,712 | 12/1974 | Reynard et al. | 260/2 P |
| 3,856,713 | 12/1974 | Rose | 260/2 P |
| 3,883,451 | 5/1975 | Reynard et al. | 260/2 P |
| 3,888,799 | 10/1975 | Rose et al. | 260/2 P |

Primary Examiner—Morton Foelak
Attorney, Agent, or Firm—Richard J. Hammond

[57] ABSTRACT

Poly(aryloxyphosphazene) copolymers and foams thereof having a significant portion of $C_1 - C_4$ alkoxyphenoxy groups are described. The copolymers consist of the units which occur in a nonregular fashion and are represented by the following general formulas:

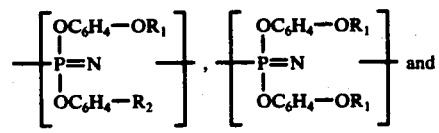

, and

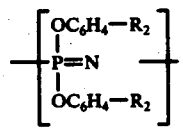

wherein $R_1$ represents a $C_1 - C_4$ linear or branched alkyl radical in the ortho-, meta-, or para-position, and $R_2$ represents hydrogen, a $C_1 - C_{10}$ linear or branched alkyl radical, or a $C_1 - C_4$ linear or branched alkoxy radical substituted on any sterically permissible position on the phenoxy group, with the proviso that when $R_2$ is alkoxy, $OR_1$ and $R_2$ are different. The copolymers of this invention may contain small amounts of randomly distributed units in addition to the repeating units described above, these additional units containing reactive sites enabling the properties of the copolymers to be modified by crosslinking and/or curing. The copolymers are elastomers, have desirable tensile strengths and may be used to form flexible or semirigid foams. The copolymers are extremely fire retardant and produce low smoke loads, or essentially no smoke, when heated in an open flame.

13 Claims, No Drawings

POLY(ARYLOXYPHOSPHAZENE) COPOLYMERS

DESCRIPTION OF THE INVENTION

This invention relates to elastomeric poly(aryloxyphosphazene) copolymers, to flexible and semirigid foams produced from said copolymers, and to a process for preparing said copolymers and foams. The copolymers of this invention are soluble in tetrahydrofuran, benzene and dimethylformamide and exhibit excellent flame retardant and film-forming properties. Foams prepared from the copolymers exhibit excellent flame retardant properties and produce low smoke levels, or essentially no smoke, when heated in an open flame. All of the copolymers described may be crosslinked at moderate temperatures in the presence of free radical initiators and the copolymers containing reactive unsaturation additionally may be cured by conventional sulfur curing or vulcanizing additives to modify their properties and expand their field of use.

The preparation of poly(aryloxyphosphazene) copolymers has been disclosed in U.S. Pat. No. 3,856,712 to Reynard et al., U.S. Pat. No. 3,856,713 to Rose et al., and U.S. Pat. No. 3,883,451 to Reynard et al. However, in contrast to the copolymers of the present invention, the copolymers described in the first mentioned Reynard et al. patent contain selected quantities of both alkoxy and aryloxy side chains in the copolymer backbone, whereas the copolymers described in the latter-mentioned Reynard et al. patent are characterized by the presence of halogen-substituted aryl side chains in the copolymer backbone. The copolymers disclosed in the above mentioned Rose et al. patent also differ from the copolymers of the present invention since they are characterized by the presence of only aryloxy and alkyl-substituted aryloxy side chains. Other related art may be found in U.S. Pat. Nos. 3,515,688; 3,700,629; 3,702,833 and 3,856,712, but in each case, the polymers described in these patents differ from the copolymers of this invention in their structure and physical characteristics.

The poly(aryloxyphosphazene) copolymers of this invention are characterized by repeating

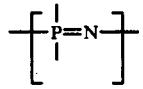

units which contain substituted aryloxy-substituents (preferably substituted in the para position) on the phosphorous atoms in nonregular fashion and which can be represented by the following formulas:

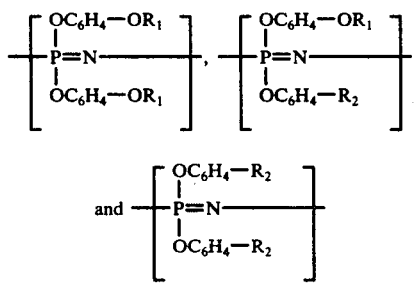

wherein $R_1$ is a $C_1 - C_4$ lineaar or branched alkyl radical in the ortho-, meta-, or para- position, and $R_2$ is hydrogen or a $C_1 - C_{10}$ linear or branched alkyl radical or a $C_1 - C_4$ linear or branched alkoxy radical, substituted in any sterically permissible position on the phenoxy group with the proviso that when $R_2$ is alkoxy, $OR_1$ and $R_2$ are different. Examples of $R_1$ include ethoxy, methoxy, isopropoxy and n-butoxy. Examples of $R_2$ include methyl, ethyl, n-propyl, isopropyl, sec-butyl, tert-butyl, tert-pentyl, 2-ethylhexyl and n-nonyl.

It is to be understood that while it is presently preferred that all $R_1$'s are the same and all $R_2$'s are the same the $R_1$ can be mixed and the $R_2$ can be mixed. The mixtures may be mixtures of different alkyl radicals or mixtures of different ortho-, meta- and para- isomers. One skilled in the art readily will recognize that steric hindrance will dictate the propriety of using relatively bulky groups in the para-position on the phenoxy ring since as set forth hereinafter the polymers are made by reacting a substituted metal phenoxide with a chlorine atom on a phosphrous atom. Desirably, groups which sterically inhibit this reaction should be avoided. Absent the foregoing proviso, the selection of the various $R_1$'s and $R_2$'s will be apparent to anyone skilled in the art based upon this disclosure.

For the sake of simplicity, the copolymers of the invention which contain the above three repeating units may be represented by the formula $[NP(OC_6H_4-OR_1)_a(OC_6H_4-R_2)_b]_n$, wherein $n$ is from about 20 to about 2000 or more, and wherein $a$ and $b$ are greater than zero and $a+b=2$.

The above described copolymers, as well as those containing reactive sites designated as W below, may be crosslinked and/or cured at moderate temperatures (for example, 200°–350° F.) by the use of free radical initiators, for example, peroxides, using conventional amounts, techniques and processing equipment.

The copolymers of this invention may contain small amounts of randomly distributed repeating units in addition to the repeating units described above. Examples of these additional repeating units are:

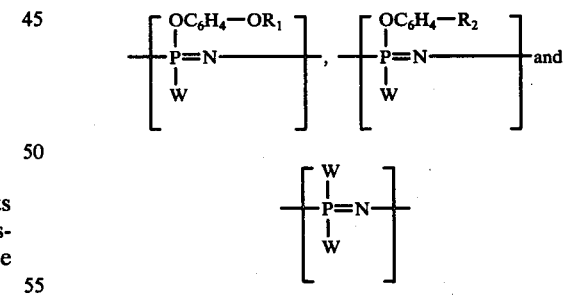

wherein W represents a group capable of a crosslinking chemical reaction, such as, an olefinically unsaturated, preferably ethylinically unsaturated monovalent radical, containing a group capable of further reaction at relatively moderate temperatures, and the ratio of $W:[(-OC_6H_4-OR_1)+(-OC_6H_4-R_2)]$ is less than about 1:5. For the sake of simplicity, the copolymers of this invention which are further reactive may be represented by the formula $[NP(OC_6H_4-OR_1)_a(OC_6H_4-R_2)_b(W)_c]_n$, wherein W, $R_1$, $R_2$, $n$, $a$ and $b$ are set forth above, and wherein $a+b+c=2$. Examples of W are $-OCH+CH_2$; $-OR_3CH=CH_2$;

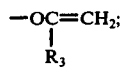

$OR_3CF=CF_2$ and similar groups which contain unsaturation, wherein $R_3$ is any aliphatic or aromatic radical, especially —$CH_2$—. These groups are capable of further reaction at moderate temperatures (for example, 200°–350° F.) in the presence of free radical initiators, conventional sulfur curing or vulcanizing additives known in the rubber art or other reagents, often even in the absence of accelerators, using conventional amounts, techniques and processing equipment.

Examples of free radical initiators include benzoyl peroxide, bis(2,4-dichlorobenzoyl peroxide), di-tert-butyl peroxide, dicumyl peroxide, 2,5-dimethyl(2,5-di-tert-butylperoxy) hexane, t-butyl perbenzoate, 2,5-dimethyl-2,5-di(tert-butyl peroxy) hepyne-3, and 1,1-bis(tert-butylperoxy)-3,3,5-trimethylcyclohexane. Thus, the general peroxide classes which may be used for crosslinking include diacyl peroxides, peroxyesters, and dialkyl peroxides.

Examples of sulfur-type curing systems include vulcanizing agents such as sulfur, sulfur monochloride, selenium, tellurium, thiuram disulfides, p-quinone dioximes, polysulfide polymers, and alkyl phenol sulfides. The above vulcanizing agents may be used in conjunction with accelerators, such as aldehyde amines, thio carbamates, thiuram sulfides, quanidines, and thiazols, and accelerator activators, such as zinc oxide or fatty acids, e.g., stearic acid.

It is also possible to use as W in the above formulas, monovalent radicals represented by the formulas (1) —$OSi(OR^4)_2R^5$ and other similar radicals which contain one or more reactive groups attached to silicon; (2) —$OR^6NR^6H$ and other radicals which contain reactive —NH linkages. In these radicals $R^4$, $R^5$ and $R^6$ each represent aliphatic, aromatic and acyl radicals. Like the groups above, these groups are capable of further reaction at moderate temperatures in the presence of compounds which effect crosslinking. The presence of a catalyst to achieve a cure is often desirable. The introduction of groups such as W into polyphosphazene polymers is shown in U.S. Pat. Nos. 3,888,799; 3,702,833 and 3,844,983, which are hereby incorporated by reference.

The ratio of $a:b$, and of $(a+b):c$ where units containing W are present in the copolymer, affects the processability, smoke production, glass transition temperature and a number of other properties of the copolymers. These ratios also affect the copolymer's ability to be foamed and the properties, such as the rigidity, or the resulting foams. For example, it has been found that an increase in the mole percent of $R_1$ decreases the amount of smoke generated when the copolymers were subjected to an open flame. It has been found, also, that as the mole percent of $R_1$ approaches 100 percent, the crystallinity of the copolymers increases and their ability to be foamed diminishes. Similarly, it has been found that when the mole percent of W increases, the degree of cross-linking increases and the ability to be foamed diminishes. Accordingly, it is contemplated that the copolymers of this invention contain a mole ratio of $a:b$ of at least about 1:6 and up to about 6:1, and preferably between about 1:4 and 4:1. It is also contemplated that the mole ratio of $c:(a+b)$ will be less than about 1:5, preferably from about 1:50 to about 1:10.

In one embodiment, the copolymers of this invention may be prepared in accordance with the process described in U.S. Pat. No. 3,370,020 to Allcock et al., which description is incorporated herein by reference. Accordingly, the copolymers of this invention may be prepared by a multistep process wherein the first step comprises thermally polymerizing a compound having the formula

by heating it at a temperature and for a length of time ranging from about 200° C. for 48 hours to 300° C. for 30 minutes, preferably in the absence of oxygen, and most preferably in the presence of a vacuum of at least $10^{-1}$ Torr. That is to say, the compounds are heated to a temperature ranging from about 200° C. to about 300° C. for from about 30 minutes to 48 hours, the higher temperatures necessitating shorter contact times and the lower temperatures necessitating longer contact times. The compounds must be heated for such a length of time that only a minor amount of unreacted charge material remains and a major amount of high polymer has been produced. Such a result is generally achieved by following the conditions of temperature and contact time specified above.

It is preferred that the thermal polymerization be carried out in the presence of an inert gas such as nitrogen, neon, argon or a vacuum, e.g., less than about $10^{-1}$ Torr inasmuch as the reaction proceeds very slowly in the presence of air. The use of such as gas, however, is not critical.

The polymers resulting from the thermal polymerization portion of the process are in the form of a polymeric mixture of different polymers of different chain lengths. That is to say, the product of the thermal polymerization is a mixture of polymers having the formula

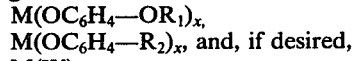

wherein $n$ ranges from about 20 to about 2000. For example, the recovered media may contain minor amounts of a polymer where $n$ is 20 and major amounts of polymer where $n$ is 2000. The media may also contain polymers composed of from 12–1999 recurring units and some unreacted trimer. The complete mixture of polymers and unreacted trimer constitutes the charge to the second step of the process.

The second or esterification step of the process comprises treating the mixture resulting from the thermal polymerization step with a mixture of compounds having the formulas $M(OC_6H_4—OR_1)_x$,
$M(OC_6H_4—R_2)_x$, and, if desired,
$M(W)_x$, wherein M is lithium, sodium, potassium, magnesium or calcium, $x$ is equal to the valence of metal M, and $R_1$, $R_2$ and W are as specified above.

The polymer mixture is reacted with the mixture of metal compounds at a temperature and a length of time ranging from about 25° C. for 7 days to about 200° C. for 3 hours.

Again, as in regard to the polymerization step mentioned above, the polymer mixture is reacted with the alkali or alkaline earth metal compounds at a temperature ranging from about 25° C. to about 200° C. for from about 3 hours to 7 days, the lower temperatures necessitating the longer reaction times and the higher temperatures allowing shorter reaction times. These conditions are, of course, utilized in order to obtain the most complete reaction possible, i.e., in order to insure the complete conversion of the chlorine atoms in the polymer mixture to the corresponding ester of the alkali or alkaline earth starting materials.

The above esterification step is carried out in the presence of a solvent. The solvent employed in the esterification step must have a relatively high boiling point (e.g., about 115° C., or higher) and should be a solvent for both the polymer and the alkali or alkaline earth metal compounds. In addition, the solvent must be substantially anhydrous, i.e., there must be no more water in the solvent or metal compounds than will result in more than 1%, by weight, of water in the reaction mixture. The prevention of water in the system is necessary in order to inhibit the reaction of the available chlorine atoms in the polymer therewith. Examples of suitable solvents include diglyme, triglyme, tetraglyme, toluene and xylene. The amount of solvent employed is not critical and any amount sufficient to solubilize the chloride polymer mixture can be employed. Either the polymer mixture or the alkaline earth (or alkali) metal compounds may be used as a solvent solution thereof in an inert, organic solvent. It is preferred, however, that at least one of the charge materials be used as a solution in a compound which is a solvent for the polymeric mixture.

The combined amount of the mixture of alkali metal or alkaline earth metal compounds employed should be at least molecularly equivalent to the number of available chlorine atoms in the polymer mixture. However, it is preferred that an excess of the metal compounds can be employed in order to assure complete reaction of all the available chlorine atoms. Generally, the ratio of the individual alkali metal or alkaline earth metal compounds on the combined mixture governs the ratio of the groups attached to the polymer backbone. However, those skilled in the art readily will appreciate that the nature and, more particularly, the steric configuration of the metal compounds employed may effect their relative reactivity. Accordingly, the ratio of $R_1$'s and $R_2$'s in the esterified product, if necessary, may be controlled by employing a stoichiometric excess of the slower reacting metal compound.

Examples of alkali or alkaline earth metal compounds which are useful in the process of the present invention include
sodium phenoxide
potassium phenoxide
sodium p-methoxyphenoxide
sodium o-methoxypheoxide
sodium m-methoxyphenoxide
lithium p-methoxyphenoxide
lithium o-methoxyphenoxide
lithium m-methoxyphenoxide
potassium p-methoxyphenoxide
potassium o-methoxyphenoxide
potassium m-methoxyphenoxide
magnesium p-methoxyphenoxide
magnesium o-methoxyphenoxide
magnesium m-methoxyphenoxide
calcium p-methoxyphenoxide
calcium o-methoxyphenoxide
calcium m-methoxyphenoxide
sodium p-ethoxyphenoride
sodium o-ethoxyphenoride
sodium m-ethoxyphenoride
potassium p-ethoxyphenoxide
potassium o-ethoxyphenoxide
potassium m-ethoxyphenoxide
sodium p-n-butoxyphenoxide
sodium m-n-butoxyphenoxide
lithium p-n-butoxyphenoxide
lithium m-n-butoxyphenoxide
potassium p-n-butoxyphenoxide
potassium m-n-butoxyphenoxide
magnesium p-n-butoxyphenoxide
magnesium m-n-butoxyphenoxide
calcium p-n-butoxyphenoxide
calcium m-n-butoxyphenoxide
sodium p-n-propoxyphenoxide
sodium o-n-propoxyphenoxide
sodium m-n-propoxyphenoxide
potassium p-n-propoxyphenoxide
potassium o-n-propoxyphenoxide
potassium m-n-propoxyphenoxide
sodium p-methylphenoxide
sodium o-methylphenoxide
sodium m-methylphenoxide
lithium p-methylphenoxide
lithium o-methylphenoxide
lithium m-methylphenoxide
sodium p-ethylphenoxide
sodium o-ethylphenoxide
sodium m-ethylphenoxide
potassium p-n-propylphenoxide
potassium o-n-propylphenoxide
potassium m-n-propylphenoxide
magnesium p-n-propylphenoxide
sodium p-isopropylphenoxide
sodium o-isopropylphenoxide
sodium m-isopropylphenoxide
calcium p-isopropylphenoxide
calcium o-isopropylphenoxide
calcium m-isopropylphenoxide
sodium p-sec butylphenoxide
sodium m-sec butylphenoxide
lithium p-sec butylphenoxide
lithium m-sec butylphenoxide
lithium p-tert. butylphenoxide
lithium m-tert. butylphenoxide
potassium p-tert. butylphenoxide
potassium m-tert. butylphenoxide
sodium p-tert. butylphenoxide
sodium m-tert. butylphenoxide
sodium propeneoxide
sodium p-nonylphenoxide
sodium m-nonylphenoxide
sodium o-nonylphenoxide
sodium 2-methyl-2-propeneoxide
potassium buteneoxide
and the like.

The second step of the process results in the production of a copolymer mixture having the formula

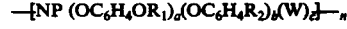

wherein $n$, $R_1$, $R_2$ and W are as specified above, where $c$, but not $a$ and $b$ can be zero, and where $a+b+c=2$, and the corresponding metal chloride salt.

The copolymeric reaction mixture resulting from the second or esterification step is then treated to remove the salt which results upon reaction of the chlorine atoms of the copolymer mixture with the metal of the alkali or alkaline earth metal compounds. The salt can be removed by merely precipitating it out and filtering, or it may be removed by any other applicable method, such as by washing the reaction mixture with water after neutralization thereof with, for example, an acid such as hydrochloric acid.

The next step in the process comprises fractionally precipitating the copolymeric material to separate out the high polymer from the low polymer and any unreacted trimer. The fractional precipitation is achieved by the, preferably dropwise, addition of the esterified copolymer mixture to a material which is a non-solvent for the high polymer and a solvent for the lower polymer and unreacted trimer. That is to say, any material which is a non-solvent for the polymers wherein $n$ is higher than 350 and a solvent for the remaining low polymers may be used to fractionally precipitate the desired polymers. Examples of materials which can be used for this purpose include hexane, diethyl ether, carbon tetrachloride, chloroform, dioxane methanol, water and the like. The fractional precipitation of the esterified copolymeric mixture generally should be carried out at least twice and preferably at least four times in order to remove as much of the low polymer from the polymer mixture as possible. The precipitation may be conducted at any temperature, however, it is preferred that room temperature be employed. The novel high molecular weight copolymer mixture may then be recovered by filtration, centrifugation, decantation or the like.

The novel copolymeric mixtures of this invention, as mentioned above, are very thermally stable. The mixtures are soluble in specific organic solvents such as tetrahydrofuran, benzene, xylene, toluene, dimethylformamide and the like and can be formed into films from solutions of the copolymers by evaporation of the solvent. The copolymers are water resistant at room temperature and do not undergo hydrolysis at high temperatures. The copolymers may be used to prepare films, fibers, coatings, molding compositions and the like. They may be blended with such additives as antioxidants, ultraviolet light absorbers, lubricants, plasticizers, dyes, pigments, fillers such as litharge, magnesia, calcium carbonate, furnace black, alumina trihydrate and hydrated silicas, other resins, etc., without detracting from the scope of the present invention.

The copolymers may be used to prepare foamed products which exhibit excellent fire retardance and which produce low smoke levels, or essentially no smoke when heated in an open flame. The foamed products may be prepared from filled or unfilled formulations using conventional foam techniques with chemical blowing agents, i.e. chemical compounds stable at original room temperature which decompose or interact at elevated temperatures to provide a cellular foam. Suitable chemical blowing agents include:

| Blowing Agent | Effective Temperature Range ° C. |
|---|---|
| Azobisisobutyronitrile | 105-120 |
| Azo dicarbonamide(1,1-azobisformamide) | 100-200 |
| Benzenesulfonyl hydrazide | 95-100 |
| N,N'-dinitroso-N,N'-dimethyl terephthalamide | |
| Dinitrosopentamethylenetetramine | 130-150 |
| Ammonium carbonate | 58 |
| p,p'-oxybis-(benzenesulfonylhydrazide) | 100-200 |
| Diazo aminobenzene | 84 |
| Urea-biuret mixture | 90-140 |
| 2,2'-azo-isobutyronitrile | 90-140 |
| Azo hexahydrobenzonitrile | 90-140 |

-continued

| Blowing Agent | Effective Temperature Range ° C. |
|---|---|
| Diisobutylene | 103 |
| 4,4'-diphenyl disulfonylazide | 110-130. |

Typical foamable formulations include: Phosphazene copolymer (e.g., $[N P (OC_6H_5) (OC_6H_4—p-OCH_3)]_n$

| | 100 parts |
|---|---|
| Filler (e.g., alumina trihydrate) | 0-100 phr |
| Stabilizer (e.g., magnesium oxide) | 2.5-10 phr |
| Processing aid (e.g., zinc stearate) | 2.5-10 phr |
| Plasticizer resin (e.g., Cumar P-10, coumarone indene resin) | 0-50 phr |
| Blowing agent (e.g., 1,1'-azobisformamide) | 10-50 phr |
| Activator (e.g., oil-treated urea) | 10-40 phr |
| Peroxide curing agent (e.g., 2,5-dimethyl-2,5-di(t-butylperoxy) hexane) | 2.5-10 phr |
| Peroxide curing agent (e.g., benzoyl peroxide) | 2.5-10 phr |

While the above are preferred formulation guidelines, obviously some or all of the adjuvants may be omitted, replaced by other functionally equivalent materials, or the proportions varied, within the skill of the art of the foam formulator.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example 100°-120° F. The homogeneous foamable mass can then be heated, to provide a foamed structure; for example, by using a mixture of a curing agent having a relatively low initiating temperature, such as benzoyl peroxide, and a curing agent having a relatively high intiating temperature, such as 2,5-dimethyl-2,5-di(t-butylperoxy) hexane, and partially pre-curing in a closed mold for about 6-30 minutes at 200°-250° F., followed by free expansion for 30-60 minutes at 300°-350° F. In the alternative, the foaming may be accomplished by heating the foamable mass for 30-60 minutes at 300°-350° F. using a high temperature or low temperature curing agent, either singly or in combination. One benefit of utilizing the "partial pre-cure" foaming technique is that an increase in the molecular weight of the foamable polymer prior to the foaming step enables better control of pore size and pore uniformity in the foaming step. The extent of "pre-cure" desired is dependent upon the ultimate foam characteristics desired. The desired foaming temperature is dependent on the nature of the blowing agent and the crosslinkers present. The time of heating is dependent on the size and shape of the mass being foamed. The resultant foams are generally light tan to yellowish in appearance, and vary from flexible to semirigid, depending upon the glass transition temperature of the copolymer employed in the foam formulation, that is to say, the lower the glass transition of the copolymer the more flexible will be the foam produced therefrom. As indicated, inert, reinforcing or other fillers such as alumina trihydrate, hydrated silicas or calcium carbonate can be added to the copolymer foams and the presence of these and other conventional additives should in no way be construed as falling outside the scope of this invention.

Also, as mentioned above, the copolymers of this invention can be crosslinked at moderate temperatures by conventional free radical and/or sulfur curing techniques when minor amounts of unsaturated groups W are present in the copolymer backbone. The ability of these copolymers to be cured at temperatures below about 350° F. makes them particularly useful as potting and encapsulation compounds, sealants, coatings and the like. These copolymers are also useful for preparing crosslinked foams which exhibit significantly increased tensile strengths over uncured foams. These copolymers are often crosslinked in the presence of inert, reinforcing or other fillers and the presence of these and other conventional additives are deemed to be within the scope of this invention.

The following examples are set forth for purposes of illustration only and are not to be construed as limitations of the present invention except as set forth in the appended claims. All parts and percentages are by weight unless otherwise indicated.

EXAMPLE 1

Preparation of $-(NPCl_2)_n$ 250 parts of phosphonitrilic chloride trimer, previously recrystallized from n-heptane, were degassed and sealed in a suitable, thick-walled reaction vessel at $10^{-2}$ Torr and heated to 250° C. for 6 hours. Polymerization was terminated at this time since a glass ball, ⅛ inch in diameter ceased to flow due to the increased viscosity of the molten mass, when the vessel was inverted. Termination was effected by cooling the vessel to room temperature. The resulting polymeric mixture was then dissolved in toluene to form an anhydrous solution.

EXAMPLE 2

Preparation of $[NP(OC_6H_4-p-OCH_3)(OC_6H_5)]_n$

The anhydrous toluene solution of poly (dichlorophosphazene) formed in Example 1, containing 0.97 equivalents of poly(dichlorophosphazene), was added to an anhydrous diglymebenzene solution of 0.62 equivalents of $NaOC_6H_4-4-OCH_3$ and 0.62 equivalents of $NaOC_6H_5$ at a temperature of 95° C. with constant stirring. After the addition, benzene was distilled from the reaction mixture until a temperature of 115°-116° C. was attained. The reaction was then heated at reflux for 60-65 hours. At the end of this time the copolymer was precipitated by pouring the reaction mixture into an excess of methyl alcohol. The polymer was stirred in the methyl alcohol for 24 hours. Next, it was added to a large excess of water and stirred for an additional 24 hours. The resulting product (40 percent yield) was a semicrystalline solid having a glass transition temperature (Tg) of +0.74° C. The product was soluble in benzene, tetrahydrofuran and dimethylformamide. The copolymer mixture was then case to a tough, transparent film from solution in tetrahydrofuran. The film was flexible, did not burn, and was water-repellant. The copolymer had an Oxygen Index (OI) of 25.0 as determined according to the procedure described in ASTM D-2863-74, "Flammability of Plastics Using the Oxygen Index Method". By this method, material samples, which are 6 × 2 × .01 to .03", are held in a U-shaped frame and the burning of the samples under a specific set of conditions is measured. It has been shown that this technique actually measures the lowest oxygen concentration in an atmosphere which will just prevent sustained burning of a top-ignited sample (see Fenimore et al, *Combustion and Flame,* 10, 135 (1966)). The oxygen index values also have been related to the temperatue at which a mixture of fuel and a controlled flow of oxygen will just burn when the fuel is composed of volatile pyrolytic products or fragments (see, Johnson et al, *Rubber Age,* 107 (No. 5), 29 (1975)). Analysis: Calculated (percent) for 1:1 copolymer of $[NP(OC_6H_4-p-OCH_3)(OC_6H_5)]_n$: C, 59.77; H, 4.64; N, 5.36; and Cl, 0.00. Found (percent): C, 59.62; H, 4.73; N, 5.38; and Cl, 0.00.

EXAMPLE 3

Preparation of $[NP(OC_6H_4-p-OCH_3)(OC_6H_4-p-CH_3)]_n$

The procedure of Example 2 was followed, except that to 0.56 equivalents of poly(dichlorophosphazene) were added 0.30 equivalents of $NaOC_6H_4-p-OCH_3$ and 0.30 equivalents of $NaOC_6H_4-p-CH_3$.

The resulting product (58 percent yield) was a crystalline solid having a glass transition temperature (Tg) of +5.90° C. The product had an Oxygen Index of 25.3 and was soluble in benzene, tetrahydrofuran and dimethylformamide. The copolymer mixture was then cast to an opaque, brittle film from a solution in tetrahydrofuran. The film did not burn, and was water-repellant.

EXAMPLE 4

Preparation of $[NP(OC_6H_4-p-OCH_3)(OC_6H_4-p-C_2H_5)]_n$

The procedure of Example 2 was followed, except that to 0.95 equivalents of poly(dichlorophosphazene) were added 0.50 equivalents of $NaOC_6H_4-p-OCH_3$ and 0.50 equivalents of $NaOC_6H_4-p-C_2H_5$.

The resulting product (43 percent yield) was a crystalline solid having a glass transition temperature (Tg) of −3.76° C. The product had an Oxygen Index of 24.0 and was soluble in benzene, tetrahydrofuran and dimethylformamide. The copolymer mixture was then cast to a tough, transparent film from solution in tetrahydrofuran. The film was flexible, did not burn, and was water-repellant.

EXAMPLE 5

Preparation of $[NP(OC_6H_4-p-OCH_3)(OC_6H_4-p-isoC_3H_7)]_n$

The procedure of Example 2 was followed, except that to 0.48 equivalents of poly(dichlorophosphazene) were added 0.29 equivalents of $NaOC_6H_4-p-OCH_3$ and 0.29 equivalents of $NaOC_6H_4-p-isoC_3H_7$.

The resulting product (48 percent yield) was a crystalline solid having a glass transition temperature (Tg) of +3.00° C. The product had an Oxygen Index of 26.0 and was soluble in benzene, tetrahydrofuran and dimethylformamide. The copolymer mixture was then cast to a tough, transparent film from solution in tetrahydrofuran. The film was flexible, did not burn, and was water resistant.

EXAMPLE 6

Preparation of $[NP(OC_6H_4-p-OCH_3)(OC_6H_4-p-tert.C_4H_9)]_n$

The procedure of Example 2 was followed, except that to 1.83 equivalents of poly(dichlorophosphazene)

were added 1.09 equivalents of NaOC$_6$H$_4$—p—OCH$_3$ and 1.09 equivalents of NaOC$_6$H$_4$—p—tert.C$_4$H$_9$.

The resulting product (51 percent yield) was a crystalline solid having a glass transition temperature (Tg) of +24.1° C. The product had an Oxygen Index of 25.0 and was soluble in benzene, tetrahydrofuran and dimethylformamide. The copolymer mixture was then cast to a transparent, tough film from solution in tetrahydrofuran. The film was brittle, did not burn, and was water resistant.

EXAMPLE 7

Preparation of [NP(OC$_6$H$_4$—p—OCH$_3$)(OC$_6$H$_4$—p—secC$_4$H$_9$)]$_n$

The procedure of Example 2 was followed, except that to 0.56 equivalents of poly(dichlorophosphazene) were added 0.33 equivalents of NaOC$_6$H$_4$—p—OCH$_3$ and 0.33 equivalents of NaOC$_6$H$_4$—p—secC$_4$H$_9$.

The resulting product (67 percent yield) was an elastomer having a glass transition temperature (Tg) of −5.03° C. The product had an Oxygen Index of 26.0 and was soluble in benzene, tetrahydrofuran and dimethylformamide. The copolymer mixture was then cast to a tough, opaque film from solution in tetrahydrofuran. The film did not burn, and was water resistant.

EXAMPLE 8

Preparation of [NP(OC$_6$H$_4$—p—OCH$_3$)(OC$_6$H$_4$—p—C$_9$H$_{19}$)]$_n$

The procedure of Example 2 was followed, except that to 1.86 equivalents of poly(dichlorophosphazene) were added 1.10 equivalents of NaOC$_6$H$_4$—p—OCH$_3$ and 1.10 equivalents of NaOC$_6$H$_4$—p—C$_9$H$_{19}$.

The resulting product (38 percent yield) was a somewhat tacky elastomeric material having a glass transition temperature (Tg) of −2.23° C. The product had an Oxygen Index of 25.0 and was soluble in benzene, tetrahydrofuran and dimethylformamide. The copolymer mixture was then cast to a resilient, opaque film from solution in tetrahydrofuran. The film was resilient, did not burn and was water resistant.

EXAMPLE 9

Preparation of [NP(OC$_6$H$_4$—p—OCH$_3$)(OC$_6$H$_4$—p—O—nC$_4$H$_9$)]$_n$

The procedure of Example 2 was followed, except that to 1.00 equivalents of poly(dichlorophosphazene) were added 0.59 equivalents of NaOC$_6$H$_4$—p—OCH$_3$ and 0.59 equivalents of NaOC$_6$H$_4$—p—O—nC$_4$H$_9$.

The resulting product (46 percent yield) was a crystalline solid having a glass transition temperature (Tg) of −5.03° C. The product had an Oxygen Index of 24.0 and was soluble in benzene, tetrahydrofuran and dimethylformamide. The copolymer mixture was then cast to a tough, transparent film from solution in tetrahydrofuran. The film did not burn, and was water resistant.

EXAMPLE 10

Preparation of [NP(OC$_6$H$_4$—p—O—nC$_4$H$_9$)(OC$_6$H$_5$)]$_n$

The procedure of Example 2 was followed, except that to 0.88 equivalents of poly(dichlorophosphazene) were added 0.49 equivalents of NaOC$_6$H$_4$—p—O—nC$_4$H$_9$ and 0.49 equivalents of NaOC$_6$H$_5$.

The resulting product (59 percent yield) was an elastomeric material having a glass transition temperature (Tg) of −11.2° C. The product had an Oxygen Index of 23.7 and was soluble in benzene, tetrahydrofuran and dimethylformamide. The copolymer mixture was then cast to an opaque film from solution in tetrahydrofuran. The film was flexible, did not burn, and was water resistant. Analysis: Calculated (percent) for 1:1 copolymer of [NP(OC$_6$H$_4$—p—O—nC$_4$H$_9$)(OC$_6$H$_5$)]$_n$: C, 63.36; H, 5.98; N, 4.62; and Cl, 0.00. Found (percent): C, 63.19; H, 5.78; N, 4.63; and Cl, 0.06.

EXAMPLE 11

Preparation of [NP (OC$_6$H$_4$—p—O—nC$_4$H$_9$)(OC$_6$H$_4$—p—CH$_3$)]$_n$

The procedure of Example 2 was followed, except that to 1.80 equivalents of poly(dichlorophosphazene) were added 1.06 equivalents of NaOC$_6$H$_4$—p—O—nC$_4$H$_9$ and 1.06 equivalents of NaOC$_6$H$_4$—p—CH$_3$.

The resulting product (35 percent yield) was a semi-crystalline material. The product was soluble in benzene, tetrahydrofuran and dimethylformamide. The copolymer mixture was then cast to a tough, transparent film from solution in tetrahydrofuran. The film did not burn, and was water resistant.

EXAMPLE 12

Preparation of [NP (OC$_6$H$_4$—p—O—nC$_4$H$_9$)(OC$_6$H$_4$—p—C$_2$H$_5$)]$_n$

The procedure of Example 2 was followed, except that to 1.88 equivalents of poly(dichlorophosphazene) were added 1.11 equivalents of Na OC$_6$H$_4$—p—O—nC$_4$H$_9$ and 1.11 equivalents of Na OC$_6$H$_4$—p—C$_2$H$_5$.

The resulting product (49 percent yield) was an elastomer having a glass trasition temperature (Tg) of −16.9° C. The product had an Oxygen Index of 24.8 and was soluble in benzene, tetrahydrofuran and dimethylformamide. The copolymer mixture was then cast to a film from solution in tetrahydrofuran. The film was flexible, did not burn, and was water resistant.

EXAMPLE 13

Preparation of [NP(OC$_6$H$_4$—p—O—nC$_4$H$_9$)(OC$_6$H$_4$—p—isoC$_3$H$_7$)]$_n$ The procedure of Example 2 was followed, except that to 1.88 equivalents of poly(dichlorophosphazene) were added 1.11 equivalents of NaOC$_6$H$_4$—p—O—nC$_4$H$_9$ and 1.11 equivalents of NaOC$_6$H$_4$—p—isoC$_3$H$_7$.

The resulting product (52 percent yield) was an elastomer having a glass transition temperature (Tg) of −9.47° C. The product had an Oxygen Index of 23.9 and was soluble in benzene, tetrahydrofuran and dimethylformamide. The copolymer mixture was then cast to a film from solution in tetrahydrofuran. The film did not burn, and was water resistant.

EXAMPLE 14

Preparation of [NP(OC$_6$H$_4$—p—O—nC$_4$H$_9$)(OC$_6$H$_4$—p—tertC$_4$H$_9$)]$_n$ The procedure of Example 2 was followed, except that to 1.80 equivalents of poly(dichlorophosphazene) were added 1.06 equivalents of NaOC$_6$H$_4$—p—O—nC$_4$H$_9$ and 1.06 equivalents of NaOC$_6$H$_4$—p—tertC$_4$H$_9$.

The resulting product (51 percent yield) was an elastomer. The product was soluble in benzene, tetrahydrofuran and dimethylformamide. The copolymer mixture was then cast to a film from solution in tetrahydrofuran. The film did not burn, and was water resistant.

EXAMPLE 15

Preparation of $[NP(OC_6H_4-p-O-nC_4H_9)(OC_6H_4-p-secC_4H_9)]_n$

The procedure of Example 2 was followed, except that to 1.76 equivalents of poly(dichlorophosphazene) were added 1.04 equivalents of $NaOC_6H_4-p-O-nC_4H_9$ and 1.04 equivalents of $NaOC_6H_4-p-secC_4H_9$.

The resulting product (41 percent yield) was soluble in benzene, tetrahydrofuran and dimethylformamide. The copolymer mixture was then cast to a film from solution in tetrahydrofuran. The film did not burn, and was water resistant.

EXAMPLE 16

Preparation of $[NP(OC_6H_4-p-OCH_3)_{0.5}(OC_6H_5)_{1.5}]_n$

The procedure of Example 2 was followed, except that to 1.86 equivalents of poly(dichlorophosphazene) were added 0.56 equivalents of $NaOC_6H_4-p-OCH_3$ and 1.67 equivalents of $NaOC_6H_5$.

The resulting product (58 percent yield) was a crystalline solid having an Oxygen Index of 25.8. The product was soluble in benzene, tetrahydrofuran and dimethylformamide. The copolymer mixture was then cast to a tough, transparent film from solution in tetrahydrofuran. The film did not burn, and was water resistant.

EXAMPLE 17

Preparation of $[NP(OC_6H_4-p-OCH_3)_{0.4}(OC_6H_5)_{1.6}]_n$

The procedure of Example 2 was followed, except that to 1.86 equivalents of poly(dichlorophosphazene) were added 0.45 equivalents of $NaOC_6H_4-p-OCH_3$ and 1.78 equivalents of $NaOC_6H_5$.

The resulting product (60 percent yield) was a crystalline solid having an Oxygen Index of 28.7. The product was soluble in benzene, tetrahydrofuran and dimethylformamide. The copolymer mixture was then cast to a tough, transparent film from solution in tetrahydrofuran. The film did not burn, and was water resistant.

EXAMPLE 18

Preparation of $[NP(OC_6H_4-p-OCH_3)_{0.5}(OC_6H_4-p-isoC_3H_7)_{1.5}]_n$

The procedure of Example 2 was followed, except that to 1.82 equivalents of poly(dichlorophosphazene) were added 0.55 equivalents of $NaOC_6H_4-p-OCH_3$ and 1.64 equivalents of $NaOC_6H_4-p-isoC_3H_7$.

The resulting product was a crystalline solid which was soluble in benzene, tetrahydrofuran and dimethylformamide. The copolymer mixture was then cast to a tough, transparent film for solution in tetrahydrofuran. The film did not burn, and was water resistant.

EXAMPLE 19

Preparation of $[NP(OC_6H_4-p-OCH_3)_{0.4}(OC_6H_4-p-isoC_3H_7)_{1.6}]_n$

The procedure of Example 2 was followed, except that to 1.80 equivalents of poly(dichlorophosphazene) were added 0.43 equivalents of $NaOC_6H_4-p-OCH_3$ and 1.73 equivalents of $NaOC_6H_4-p-isoC_3H_7$.

The resulting product (41 percent yield) was a crystalline solid. The product was soluble in benzene, tetrahydrofuran and dimethylformamide. The copolymer mixture was then cast to a tough, transparent film from solution in tetrahydrofuran. The film did not burn, and was water resistant.

EXAMPLE 20

Poly(aryloxyphosphazene) homopolymers and copolymers were prepared by a multistep process beginning with the thermal polymerization of hexachlorocyclotriphosphazene, $N_3P_3Cl_6$, as described in Example 1. The resulting poly(dichlorophosphazene) $[NPCl_2]_n$ was dissolved in a suitable solvent, such as toluene. This polymeric solution was then added to a bis(2-methoxyethyl) ether solution of the desired sodium aryloxide salt at 95° C. (Copolymers were prepared by adding the polymer to a solution containing a 1:1 mole ratio of the two desired sodium aryloxide salts.) The reaction temperature was raised to 115–116° C. and maintained for 50–65 hours with constant stirring. The thermal polymerization and subsequent reaction are summarized in Equations (1) and (2):

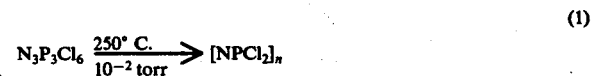

(1)

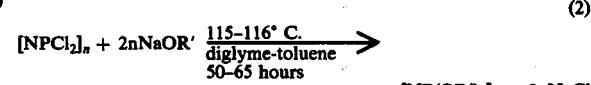

(2)

After the reaction was completed, the polymers were precipitated by pouring the reaction mixture into an excess of methanol, were washed for 24 hours in methanol, and finally were exhaustively washed with distilled water. The polymers ranged from rigid fiber-like materials to elastomers and, except for a few cases, were colorless. Polymers prepared, and their glass-transition temperatures are listed in Table I. Analytical data were in agreement with the tabulated empirical formulas.

Table 1

| Glass Transition Temperatures of Poly(aryloxyphosphazene) Polymers* | |
|---|---|
| $[NP(OR')_2]_n$ | Tg, °C |
| R' = $C_6H_5$ | −7.7 |
| $C_6H_4$-p-$CH_3$ | +2.0 |
| $C_6H_4$-p-$C_2H_5$ | −19 |
| $C_6H_4$-p-n-$C_3H_7$ | −34 |
| $C_6H_4$-p-iso-$C_3H_7$ | −0.10 |
| $C_6H_4$-p-sec-$C_4H_9$ | −16 |
| $C_6H_4$-p-tert-$C_4H_9$ | +44 |
| $C_6H_4$-p-$OCH_3$ | +0.60 |
| $C_6H_4$-p-O-n-$C_4H_9$ | −21 |
| $[NP(OR')(OR'')]_n$ | |
| R' = $C_6H_5$   R" = $C_6H_4$-p-iso-$C_3H_7$ | −7.8 |
| $C_6H_5$        $C_6H_4$-p-sec-$C_4H_9$ | −8.1 |

*Determined by differential scanning calorimetry. The above values are based on Indium standard (melt temperature 156.6° C.)

EXAMPLE 21

Films of unfilled poly(aryloxyphosphazenes) were prepared by compression molding of the raw polymers of Example 20. These films were formed at relatively low temperatures, 100 to 135° C., and at moderate pressures, 1000 to 5000 psi. Nominal thickness ranged from 20 to 30 mils. These films were allowed to remain at ambient conditions for 24 to 48 before die-cutting to the required sample sizes for flame and smoke testing.

A series of filled poly(aryloxyphosphazene) films were prepared by mixing and blending the various polymers with the appropriate fillers on a 2-roll research mill. One roll was heated to approximately 50° C. while the other roll was at ambient temperature. Mixes was blended for 1½ hour. Three common filler materials were utilized. These were: Hydral-710, alumina trihydrate (64.7% $Al_2O_3$); calcium carbonate (limestone, 325-mesh); and HiSil-233 (precipitated hydrated silica). Three concentration levels of each filter were evaluated and these were prepared on a weight basis: 10, 25 and 50 phr (parts per hundred parts of polyphosphazene).

Flame-retardant properties of the various filled and unfilled poly(aryloxyphosphazene) films were determined using both a Bunsen-burner test and an oxygen index apparatus.

Some samples of unfilled polyphosphazene films when heated in the open flame of a Bunsen-burner dripped profusely. Certain samples developed flaming drips which ignited cotton placed below the sample. Addition of fillers in most cases either prevented dripping or significantly reduced it.

Oxygen Index (OI) of film samples (or foamed samples where appropriate) of filled and unfilled poly(aryloxyphosphazenes) were determined according to the procedure described in ASTM D-2863-74, "Flammability of Plastics Using the Oxygen Index Method". Film samples, $6 \times 2 \times .01$ to $.03$", were held in a U-shaped frame during testing. (Where OI of foams was measured, the foams were self-supporting or suspended by a wire through the center of the foam.) The oxygen index test (OI) measures the burning of a material under a specific set of conditions. It has been shown that it actually measures the lowest oxygen concentration in an atmosphere which will just prevent sustained burning of a top-ignited sample (see Fenimore et al, *Combustion and Flame*, 10, 135 (1966). The oxygen index values also have been related to the temperature at which a mixture of fuel and a controlled flow of oxygen will just burn when the fuel is composed of volatile pyrolytic products or fragments (see, Johnson et al, *Rubber Age*, 107 (No. 5), 29 (1975)).

Smoke-evolution properties of filled and unfilled poly(aryloxyphosphazene) films and foams were evaluated by using an Aminco-NBS Smoke Density Chamber (Model 4-5800, Aminco-NBS Smoke Density Chamber, American Instrument Co.), as described by Gross et al, "A Method of Measuring Smoke Density from Burning Materials", ASTM STP-422 (1967). Samples were tested using the flaming and nonflaming test modes. This small scale test subjects a sample to the two general conditions which prevail in the majority of "real" fires and especially in tunnel tests. In the tests the maximum specific optical density Dm, corrected for soot deposits on the cell windows was measured, and a smoke value per gram, SV/g, or Dm(corr) /g of sample was calculated for each mode. This allows for correction of the smoke density value for its sample weight, since the samples are quite thin. The average value of Dm(corr) using both the flaming and nonflaming modes was also calculated. An average Dm(corr) value of 450 as determined in the NBS Smoke Density Chamber has been adopted as a regulation value by the U.S. Department of Health, Education and Welfare, see HEW Publication No. (HRA) 74-4000 (1974). Generally, NBS smoke values of 450 or less are normally required in those fire or code regulations restricting smoke evolution. Values of 200 or less are uncommon for most organic polymers; those less than 100 are quite rare.

Sample films were prepared by pressing the filled and unfilled materials for 5 to 20 minutes at 100 to 130° C. under 1000 to 5000 psi. The resultant films were die-cut to $3 \times 3 \times 0.02$ to $0.03$". Foam samples were die-cut to $3 \times 3 \times 0.2$ to $0.3$". These samples were conditioned for 48 hours at 23° C. and 50% relative humidity prior to testing. A modified specimen holder with trough and a modified burner were used in all tests. While some unfilled samples softened and melted somewhat, none filled or overflowed the trough during testing.

Poly(aryloxyphosphazenes) exhibit a high degree of flame resistance and can be considered essentially "self-extinguishing" materials in air. Oxygen index values for some unfilled phosphazene polymers are listed in Table 2. Values of aryloxyphosphazene homo- and copolymers ranged from 23 to 34. In general, as the organic content of the polymer was increased the OI value was lowered. When copolymers were tested, the OI value tended to be nearer that of the corresponding higher organic content homopolymer. For example, $[NP(OC_6H_5)_2]_n$ polymer had an OI value of 33.8, whereas the $[NP(OC_6H_4-p-iso-C_3H_7)_2]_n$ polymer was rated at 23.4. The corresponding copolymer, $[NP(OC_6H_5)(OC_6H_4-p-iso-C_3H_7]$, had a value of 25.8. Certain other commercial polymers are listed. These organic polymers, while tested at a thickness of 0.125 inches, indicate the relative flammability for some commercial materials. As will be shown, the addition of fillers may increase or decrease the OI value depending on the polymeric backbone substituents and the type of filler used.

Table 2

| Oxygen Index Values for Poly(aryloxyphosphazenes) and Reference Polymers | |
|---|---|
| Polymer | OI |
| Polyethylene | 17.4 |
| Polystyrene | 17.8 |
| Poly(vinyl chloride) | 43.5 |
| Polycarbonate | 27.4 |
| ABS-Rubber | 18.3 |
| Silicone Rubber [GE-SE 9035] | 25.8 |
| $[NP(OR')_2]_n$ | |
| $R' = C_6H_5$ | 33.8 |
| $C_6H_4-p-CH_3$ | 26.4 |
| $C_6H_4-p-C_2H_5$ | 25.0 |
| $C_6H_4-p-nC_3H_7$ | 25.5 |
| $C_6H_4-p-iso\ C_3H_7$ | 23.4 |
| $C_6H_4-p-sec\ C_4H_9$ | 23.9 |
| $C_6H_4-p-tert\ C_4H_9$ | 25.2 |
| $C_6H_4-p-OCH_3$ | 25.5 |
| $C_6H_4-p-O-nC_4H_9$ | 23.7 |
| $[NP(OR')(OR'')]_n$ | |
| $R' = C_6H_5\quad R'' = C_6H_4-p-iso\ C_3H_7$ | 25.8 |
| $C_6H_5\quad\quad C_6H_4-p-sec\ C\ H$ | 25.9 |
| $C_6H_5\quad\quad C_6H_4-p-CH_3$ | 27.0 |
| $C_6H_5\quad\quad C_6H_4-p-C_2H_5$ | 27.0 |
| $C_6H_5\quad\quad C_6H_4-p-iso\ C_3H_7$ | 25.8 |
| $C_6H_5\quad\quad C_6H_4-p-sec\ C_4H_9$ | 25.9 |
| $C_6H_5\quad\quad C_6H_4-p-tert\ C_4H_9$ | 26.0 |
| $C_6H_5\quad\quad C_6H_4-p-C_4H_{19}$ | 24.7 |
| $[NP(OC_6H_4-p-OCH_3)(R)]_n$ | |
| $R = (OC_6H_5)$ | 25.0 |
| $(OC_6H_4-p-CH_3)$ | 25.3 |
| $(OC_6H_4-p-C_2H_5)$ | 24.0 |
| $(OC_6H_4-p-iso\ C_3H_7)$ | 26.0 |
| $(OC_6H_4-p-sec\ C_4H_9)$ | 26.0 |
| $(OC_6H_4-p-tert\ C_4H_9)$ | 25.0 |
| Polymer | OI |
| $(OC_6H_4-p-C_9H_{19})$ | 25.0 |
| $(OC_6H_4-p-OCH_3)$ | 25.5 |
| $(OC_6H_4-p-O-nC_4H_9)$ | 24.0 |
| $[NP(OC_6H_4-p-OnC_4H_9)(R)]_n$ | |
| $R = (OC_6H_5)$ | 23.7 |

Table 2-continued
Oxygen Index Values for Poly(aryloxyphosphazenes) and Reference Polymers

| Polymer | OI |
|---|---|
| $(OC_6H_4\text{-p-}CH_3)$ | 24.3 |
| $(OC_6H_4\text{-p-}C_2H_5)$ | 24.8 |
| $(OC_6H_4\text{-p-iso }C_3H_7)$ | 23.9 |
| $(OC_6H_4\text{-p-sec }C_4H_9)$ | 23.1 |
| $(OC_6H_4\text{-p-tert }C_4H_9)$ | 24.6 |
| $(OC_6H_4\text{-p-}OCH_3)$ | 24.0 |
| $(OC_6H_4\text{-p-O-}nC_4H_9)$ | 23.7 |
| $[NP(OC_6H_4\text{-4-}OCH_3)_{0.5}(OC_6H_5)_{1.5}]_n$ | 25.8 |
| $[NP(OC_6H_4\text{-4-}OCH_3)_{0.4}(OC_6H_5)_{1.6}]_n$ | 28.7 |

Table 3
NBS Smoke Density Test Results
Poly(aryloxyphosphazenes) and Reference Polymers

| Polymer | Flaming Mode(F) Dm(corr) | SV/g | Nonflaming Mode (N) Dm(corr) | SV/g | Dm(Avg.) $\frac{F+N}{2}$ |
|---|---|---|---|---|---|
| Polyethylene | 150 | — | 468 | — | 309 |
| Polystyrene | 468 | — | 460 | — | 464 |
| Poly(vinyl chloride) | 530 | — | 490 | — | 510 |
| Polycarbonate | >660 | — | 44 | — | 352+ |
| ABS-Rubber | 180 | — | 305 | — | 243 |
| Silicone Rubber (GE-SE9035) | 385 | — | 240 | — | 313 |
| $[NP(OR')_2]_n$ | | | | | |
| $R' = C_6H_5$ | 322 | 50 | 204 | 36 | 263 |
| $C_6H_4\text{-p-}CH_3$ | 321 | 68 | 81 | 14 | 201 |
| $C_6H_4\text{-p-}C_2H_5$ | 305 | 70 | 9 | 2 | 157 |
| $C_6H_4\text{-p-n}C_3H_7$ | 286 | 65 | N.D.* | N.D.* | N.D.* |
| $C_6H_4\text{-p-iso }C_3H_7$ | 213 | 69 | 63 | 22 | 138 |
| $C_6H_4\text{-p-sec }C_4H_9$ | 230 | 59 | 145 | 24 | 188 |
| $C_6H_4\text{-p-tert }C_4H_9$ | 198 | 84 | 145 | 57 | 172 |
| $C_6H_4\text{-p-}OCH_3$ | 120 | 27 | 23 | 9 | 72 |
| $C_6H_4\text{-p-O-n}C_4H_9$ | 60 | 18 | 5 | 1 | 33 |
| $[NP(OR')(OR'')]_n$ | | | | | |
| $R' = C_6H_5$, $R'' = C_6H_5\text{-4-iso }C_3H_7$ | 323 | 53 | 19 | 3 | 171 |
| $R' = C_6H_5$, $R'' = C_6H_4\text{-p-sec }C_4H_9$ | 229 | 60 | 48 | 11 | 139 |
| $R' = C_6H_5$, $R''$ $C_6H_4\text{-p-}CH_3$ | 270 | 56 | 101 | 16 | 186 |
| $R' = C_6H_5$, $R'' = C_6H_4\text{-p-}C_2H_5$ | 331 | 58 | 54 | 7 | 193 |
| $R' = C_6H_5$, $R'' = C_6H_4\text{-p-tert }C_4H_9$ | 281 | 65 | 87 | 19 | 184 |
| $R' = C_6H_5$, $R'' = C_6H_4\text{-p-}C_9H_{19}$ | 166 | 88 | 51 | 13 | 109 |
| $[NP(OC_6H_4\text{-p-}OCH_3)(R)]_n$ | | | | | |
| $R = (OC_6H_5)$ | 151 | 38 | 72 | 13 | 112 |
| $(OC_6H_4\text{-p-}CH_3)$ | 134 | 35 | 49 | 13 | 92 |
| $(OC_6H_4\text{-p-}C_2H_5)$ | 139 | 26 | 44 | 10 | 92 |
| $(OC_6H_4\text{-p-iso }C_3H_7)$ | 148 | 30 | 20 | 3 | 84 |
| $(OC_6H_4\text{-p-sec }C_4H_9)$ | 154 | 28 | 19 | 2 | 87 |
| $(OC_6H_4\text{-p-tert }C_4H_9)$ | 132 | 26 | 0 | 0 | 66 |
| $(OC_6H_4\text{-p-}C_9H_{19})$ | 177 | 32 | 68 | 14 | 123 |
| $(OC_6H_4\text{-p-}OCH_3)$ | 120 | 27 | 23 | 9 | 72 |
| $(OC_6H_4\text{-p-O-n}C_4H_9)$ | 108 | 29 | 1 | 0 | 55 |
| $[NP(OC_6H_4\text{-p-}OCH_3)_{0.5}(OC_6H_5)_{1.5}]_n$ | 192 | 32 | 48 | 7 | 120 |
| $[NP(OC_6H_4\text{-p-}OCH_3)_{0.4}(OC_6H_5)_{1.6}]_n$ | 217 | 46 | 100 | 16 | 159 |
| $[NP(OC_6H_4\text{-p-O-n}C_4H_9)(R)]_n$ | | | | | |
| $R = (OC_6H_5)$ | 104 | 28 | 30 | 7 | 67 |
| $(OC_6H_4\text{-p-}CH_3)$ | 137 | 25 | 28 | 5 | 83 |
| $(OC_6H_4\text{-p-}C_2H_5)$ | 138 | 26 | 17 | 4 | 78 |
| $(OC_6H_4\text{-p-iso }C_3H_7)$ | 174 | 37 | 22 | 5 | 98 |
| $(OC_6H_4\text{-p-}OCH_3)$ | 109 | 29 | 1 | 0 | 55 |
| $(OC_6H_4\text{-p-O-n}C_4H_9)$ | 60 | 18 | 6 | 1 | 33 |

*N.D. = Not Determined.

Filled poly(aryloxyphosphazenes) were also tested, as above. Three common filler materials were employed. Alumina trihydrate, $Al_2O_3 \cdot 3H_2O$, has long been used as an effective fire retardant and smoke inhibitor for elastomeric materials, such as polyolefins and polydienes. Calcium carbonate is an inexpensive, inorganic material widely used to increase bulk density in commercial polymeric blends and to prevent dripping in so-called borderline "self-extinguishing" polymer mixtures. It has not been shown to be an effective fire retardant, except as a diluent, and it is not a known smoke suppressant. Hydrated silica is another mineral filler used as a fire-retardant additive and a reinforcing filler in materials, such as polyacrylic polymers.

The physical properties of the poly(arlyoxyphosphazenes) tested cover a range due to the substituent on the phenoxy group. This substituent apparently controls to a large degree the flame retardant and smoke evolution properties of the corresponding phosphazene polymer. The structure investigated were:

$[NP(OC_6H_5)_2]_n$, $[NP(OC_6H_4\text{---p---}OCH_3)_2]_n$, and $[NP(OC_6H_4\text{---p---sec---}C_4H_9)_2]_n$.

Table 4 lists the flame and smoke density results obtained for filled samples of $[NP(OC_6H_5)_2]_n$. High loadings of alumina and calcium carbonate increased the OI value, whereas addition of various amounts of hydrated silica did not affect this value. Smoke-test results demonstrate a moderate reduction in smoke density as the filler concentrations are increased. Based on these data it would appear that hydrated silica lowers the smoke concentration more than the other two. However, using the SV/g values it can be seen that all appear to be within the same general range and really no concentration of additive is outstanding. Thus, an anomaly occurs where the test numbers show lower smoke values, but when normalized on a weight basis, the values are essentially constant.

values obtained for this polymer were much lower than for the other two poly-phosphazenes. Calcium carbonate-filled samples had the lowest smoke density values.

Table 5

Flame and Smoke Test Results of Filled $[NP(OC_6H_4\text{-p-}OCH_3)_2]_n$
NBS Smoke Density Test

| Additive (phr)[1] | Flaming Mode(F) | | Nonflaming Mode(N) | | $\dfrac{Dm(Avg)}{F + N}$ | OI |
|---|---|---|---|---|---|---|
| | Dm(corr) | SV/g | Dm(corr) | SV/g | 2 | |
| 0 | 120 | 27 | 23 | 9 | 72 | 25.5 |
| 10A | 165 | 38 | 39 | 9 | 102 | 35.3 |
| 10C | 79 | 19 | 14 | 3 | 47 | 27.3 |
| 10S | 80 | 23 | 25 | 6 | 53 | 28.3 |
| 25A | 137 | 30 | 34 | 8 | 86 | 35.3 |
| 25C | 83 | 19 | 16 | 4 | 50 | 27.3 |
| 25S | 89 | 23 | 32 | 7 | 61 | 27.0 |
| 50A | 73 | 18 | 24 | 6 | 49 | 43.5 |
| 50C | 40 | 9 | 17 | 3 | 29 | 29.8 |
| 50S | 81 | 22 | 45 | 11 | 63 | 30.0 |

[1]Additive used per one hundred parts polymer.
A = Hydral-710, alumina trihydrate.
C = Limestone-325M, calcium carbonate.
S = HiSil-233, hydrated silica.

Table 6 lists the flame and smoke test results obtained for filled samples of $[NP(OC_6H_4\text{—p—sec—}C_4H_9)_2]_n$. Generally, the additives used had little effect upon the OI value, although all additives at the concentrations tested did increase the OI value slightly. The additives used did lower the smoke density values obtained and in general, the values decreased as the filler concentrations were increased.

Table 4

Flame and Smoke Test Results of Filled $[NP(OC_6H_5)_2]_n$
NBS Smoke Density Test

| Additive (phr)[1] | Flaming Mode(F) | | Nonflaming Mode(N) | | $\dfrac{Dm(Avg)}{F + N}$ | OI |
|---|---|---|---|---|---|---|
| | Dm(corr) | SV/g | Dm(corr) | SV/g | 2 | |
| 0 | 322 | 50 | 204 | 36 | 263 | 33.9 |
| 10A | 282 | 68 | 207 | 51 | 245 | 31.0 |
| 10C | 268 | 64 | 97 | 27 | 183 | 29.4 |
| 10S | 203 | 77 | 141 | 46 | 172 | 29.8 |
| 25A | 304 | 76 | 182 | 43 | 243 | 34.8 |
| 25C | 283 | 83 | 123 | 34 | 203 | 31.5 |
| 25S | 223 | 69 | 116 | 31 | 170 | 29.8 |
| 50A | 211 | 49 | 257 | 55 | 234 | 38.3 |
| 50C | 300 | 63 | 136 | 29 | 194 | 39.6 |
| 50S | 177 | 47 | 143 | 39 | 160 | 29.8 |

[1]Additive used per one hundred parts of polymer.
A = Hydral-710, alumina trihydrate.
C = Limestone-325M, calcium carbonate.
S = HiSil-233, hydrated silica.

Table 5 lists the flame and smoke values determined with filled samples of $[NP(OC_6H_4\text{—p—}OCH_3)_2]_n$. Addition of the fillers at all levels increased the OI values. Alumina trihydrate caused the most significant increase; calcium carbonate was least effective. Smoke density Table 6

Flame and Smoke Test Results of Filled $[NP(OC_6H_4\text{-4-sec }C_4H_9)_2]_n$
NBS Smoke Density Test

| Additive (phr)[1] | Flaming Mode(F) | | Nonflaming Mode(N) | | $\dfrac{Dm(Avg)}{F + N}$ | OI |
|---|---|---|---|---|---|---|
| | Dm(corr) | SV/g | Dm(corr) | SV/g | 2 | |
| 0 | 230 | 59 | 145 | 24 | 188 | 23.9 |
| 10A | 383 | 82 | 19 | 4 | 201 | 24.2 |
| 10C | 242 | 58 | 48 | 14 | 145 | 25.5 |
| 10S | 374 | 85 | 61 | 14 | 218 | 24.7 |
| 25A | 268 | 54 | 52 | 11 | 160 | 25.8 |
| 25C | 154 | 24 | 13 | 2 | 84 | 26.4 |
| 25S | 281 | 47 | 81 | 14 | 181 | 25.5 |
| 50A | 148 | 30 | 42 | 9 | 95 | 29.1 |
| 50C | 131 | 27 | 9 | 2 | 70 | 26.7 |
| 50S | 215 | 48 | 71 | 14 | 143 | 26.7 |

[1]Additive used per one hundred parts polymer.
A = Hydral-710, alumina trihydrate.
C = Limestone-325M, calcium carbonate.
S = HiSil-233, hydrated silica.

EXAMPLE 22

To 100 parts of the copolymer prepared in accordance with Example 8, there were added 100 parts of alumina trihydrate, 5 parts of magnesium oxide, 5 parts of zinc stearate, 10 parts of Celogen AZ (1,1'azobisformamide), 3 parts of oil-treated urea as an activator, 7 parts of 2,5-dimethyl-2,5-di(t-butylperoxy)hexane and 3 parts of benzoyl peroxide (78% active, wet with water). The above ingredients were milled to insure homogeneous mixing of all materials and were then free blown at 325°–350° F. for 15 minutes. The resultant foam was light tan in color and was flexible. The foam density was 9.7 pounds per cubic foot. When exposed to an open flame the foam did not burn and produced essentially no smoke. The foam had an Oxygen Index (OI) of 38.7, a flaming mode smoke density (Dm(corr)$_F$) of 48, and a smoke value per gram (SV/g) of 8, each determined in accordance with the procedure set forth in Example 21.

EXAMPLE 23

Preparation of Foamed [NP(OC$_6$H$_4$—p—OCH$_3$)(OC$_6$H$_4$—p—sec—C$_4$H$_9$)]$_n$ To 100 parts of the copolymer prepared in accordance with Example 7, there were added 100 parts of alumina trihydrate, 5 parts of magnesium oxide, 10 parts of zinc stearate, 2 parts of CUMAR P-10 (p-coumarone-indene resin), 20 parts of Celogen AZ (1,1'azobisformamide), 5 parts of BIK-OT (an oil-treated urea) as an activator, 6 parts of 2,5-dimethyl-2,5-di(t-butylperoxy)-hexane, 2 parts of benzoyl peroxide (78% active), and 1 part of dicumyl peroxide. The above ingredients were milled to insure homogeneous mixing of all materials and were then precured in an open sided mold for 10 minutes at 230° F. under 2000 psi. The precured copolymer was then free expanded in a circulating air oven for 30 minutes at 300° F. The resultant foam was light tan in color and was flexible. The foam density was 9.2 pounds per cubic foot. When exposed to an open flame the foam did not burn and produced essentially no smoke. The foam had an OI of 34.9, a Dm(corr)$_F$ of 67 and a SV/g of 12.

EXAMPLE 24

A series of foams containing the copolymer prepared in accordance with Example 7 were prepared with varying amounts of alumina trihydrate filler by the procedure set forth in Example 23. The amount of alumina trihydrate, the foam density, the Oxygen Index, and smoke values for the resulting series of foams are set forth in Table 7.

Table 7

| Parts of Alumina Trihydrate per 100 Parts Copolymer | Foam Density lbs/ft$^3$ | OI | NBS Flaming Mode Dm(corr)F | SV/g |
|---|---|---|---|---|
| 50 | 6.8 | 29.6 | 80 | 20 |
| 62.5 | 4.3 | 31.0 | 78 | 20 |
| 75 | 8.3 | 32.8 | 109 | 22 |
| 112.5 | 8.2 | 41.8 | 121 | 18 |
| 125 | 6.1 | 45.9 | 104 | 19 |
| 137.5 | 15.9 | 47.9 | 87 | 8 |
| 150 | 17.4 | 48.4 | 85 | 8 |
| 175 | 22.2 | 59.0 | 94 | 8 |

EXAMPLE 25

Preparation of Foamed [NP(OC$_6$H$_4$—p—O—nC$_4$H$_9$)(OC$_6$H$_4$—p—iso C$_3$H$_7$)]$_n$ To 100 parts of the copolymer prepared in accordance with Example 13, there were added 100 parts of alumina trihydrate, 5 parts of magnesium oxide, 10 parts of zinc stearate, 2 parts of CUMAR P-10, a p-coumarone-indene resin, 20 parts of Celogen AZ (1,1'azobisformamide), 5 parts of BIK-OT, an oil treated urea, 7 parts of 2,5-dimethyl-2,5-di(t-butylperoxy)hexane and 3 parts of benzoyl peroxide 78% active, wet with water). The above ingredients were milled to insure homogeneous mixing of all materials. The resultant mix was precured between plates having spacers under 2000 psi pressure for 10 minutes at 230° F. This material was then free expanded in a circulating air oven for 30 minutes at 300° F. The final foam was dark tan in color and was quite flexible. The foam density was 4.7 pounds per cubic foot. When exposed to an open flame the foam did not burn and produced essentially no smoke. The foam had an OI of 32.2 a Dm(corr)$_F$ of 33, and an SV/g$_F$ of 9.

What is claimed is:

1. A copolymer having randomly distributed repeating units represented by the formulas:

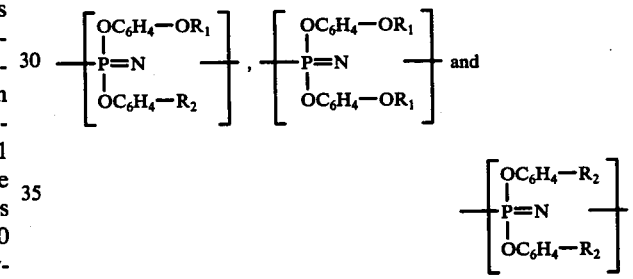

wherein R$_1$ is C$_1$-C$_4$ linear or branched alkyl, and R$_2$ is hydrogen, C$_1$-C$_{10}$ linear or branched alkyl or C$_1$-C$_4$ linear or branched alkoxy, with the proviso that when R$_2$ is alkoxy, OR$_1$ and R$_2$ are different, the ratio of (OC$_6$H$_4$—OR$_1$):(OC$_6$H$_4$-R$_2$) being from about 1:6 to about 6:1.

2. Copolymers, as in claim 1, having randomly distributed repeating units represented by the formulas

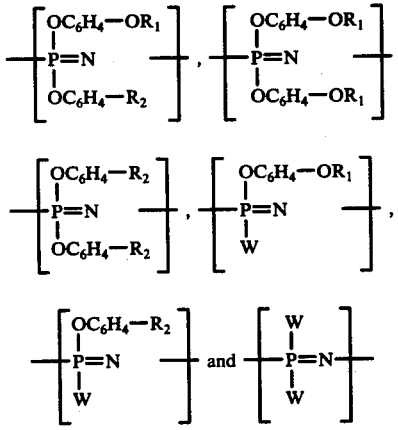

wherein R$_1$ is individually CH$_3$ or n—C$_4$H$_6$, R$_2$ is individually hydrogen, C$_1$-C$_{10}$ alkyl or C$_1$-C$_4$ alkoxy with the proviso that when $R_2$ is alkoxy, $OR_1$ and $R_2$ are different, and W represents a monovalent radical containing a group capable of a cross-linking chemical reaction at moderate temperatures, said group being attached to a P atom by a —O— linkage, the ratio of $(OC_6H_4—OR_1):(OC_6H_4—R_2)$ being from about 1:6 to about 6:1, and the ratio of $W:[(OC_6H_4—OR_1)+(OC_6H_4—R_2)]$ being less than about 1:5.

3. The process of curing the copolymers of claim 2 where W is present which comprises heating said copolymers at temperatures ranging from 200° to 350° F. utilizing sulfur-type curing agents.

4. The polymer of claim 2 cured with a sulfur-type curing agent.

5. The process of curing the copolymers of claim 1 which comprises heating said copolymers at temperatures ranging from 200° to 350° F. utilizing peroxide-type curing agents.

6. The polymer of claim 1 cured with a perioxide curing agent.

7. The process of curing the copolymers of claim 2 which comprises heating said copolymers at temperatures ranging from 200° to 350° F. utilizing peroxide-type curing agents.

8. The polymer of claim 2 cured with a perioxide curing agent.

9. Poly(aryloxyphosphazene) copolymers having the general formula:

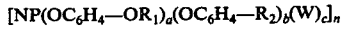

wherein $R_1$ is individually $C_1$-$C_4$ linear or branched alkyl; $R_2$ is individually hydrogen, $C_1$—$C_{10}$ linear or branched alkyl or $C_1$—$C_4$ linear or branched alkoxy, with the proviso that when $R_2$ is alkoxy, $OR_1$ and $R_2$ are different; W represents a monovalent radical containing a group capable of a cross-linking chemical reaction at moderate temperatures, said group being attached to a P atom by a —O— linkage; n is from 20 to 2000, $c \geq o$, $a+b+c=2$, the ratio of $a:b$ is from about 1:6 to 6:1, and the ratio of $c: (a+b)$ is less than about 1:5.

10. The copolymers of claim 9 wherein $c=o$ and $R_1$ is $CH_3$.

11. The copolymers of claim 9 wherein $c=o$ and $R_1$ is $n$—$C_4H_9$.

12. The copolymers of claim 10 wherein the ratio of $a:b$ is from 1:4 to 4:1.

13. The copolymers of claim 11 wherein the ratio of $a:b$ is from 1:4 to 4:1.

* * * * *